United States Patent [19]
Lichte et al.

[11] Patent Number: 5,197,178
[45] Date of Patent: Mar. 30, 1993

[54] SEALED COMPUTER TERMINAL KEYBOARD

[75] Inventors: Leo J. Lichte, Riverside, Calif.; Robert H. Leith, Sherwood, Oreg.; Meryl E. Miller, Rancho Palos Verdes; Leroy N. Nopper, Jr., Irvine, both of Calif.; Terrence K. Jones, Portland, Oreg.

[73] Assignee: Tektronix, Inc., Wilsonville, Oreg.

[21] Appl. No.: 562,510

[22] Filed: Aug. 2, 1990
(Under 37 CFR 1.47)

Related U.S. Application Data

[63] Continuation of Ser. No. 118,843, Jan. 9, 1987, which is a continuation-in-part of Ser. No. 89,812, Aug. 27, 1987, Pat. No. 5,021,638.

[51] Int. Cl.$^5$ .............................................. B21D 39/00
[52] U.S. Cl. ...................................... 29/428; 29/451; 29/453; 29/525.1; 206/305; 206/320
[58] Field of Search .................. 235/145 R, 145 A; 200/302.1, 302.2, 304, 309; 379/368, 451, 452, 447; 400/496, 714; 206/305, 320, 525; 29/525.1, 428, 450, 451, 453

[56] References Cited

U.S. PATENT DOCUMENTS

| | | | |
|---|---|---|---|
| 2,521,558 | 9/1950 | Alvarez | 29/453 X |
| 2,797,448 | 7/1957 | Revell et al. | 29/453 X |
| 4,006,764 | 2/1977 | Yamamoto et al. | 206/305 X |
| 4,669,610 | 6/1987 | Lindsey et al. | 206/320 |
| 4,703,160 | 10/1987 | Narashima et al. | 206/305 X |

OTHER PUBLICATIONS

Duralith Corporation Product Brochure (dated May, 1985).
Elastikey Product Bulletin (dated Feb., 1986).
Bebie & Co. Tacton Keyboards Product Bulletins (dated 1986).
Flex-Key Corporation Product Bulletins 1001–1007 (dated 1983).

*Primary Examiner*—Joseph M. Gorski
*Attorney, Agent, or Firm*—Alexander C. Johnson, Jr.

[57] ABSTRACT

A computer terminal keyboard is sealed by a molded elastomeric top cover, shaped to conform to the housing and keys of the keyboard, and a bottom cover shaped to enclose the base of and secure the top cover around its periphery to the keyboard housing. The top cover is shaped to provide a substantially planar surface on the top plate with elevated individual key covers integrally formed in the top cover. Portitons of the top cover extending over the top face and sides of the keyboard housing are formed in a first thickness sufficient to provide a durable covering. Portions of the top cover immediately adjacent and between the individual key covers, and the sides of the key covers, are formed in a reduced, second thickness to allow for flexure as the keys are depressed. The top surface of the top cover is planar so that spilled liquid and debris are easily wiped or brushed away from around and between the key covers. The bottom cover is formed of a rigid material and has edges shaped to mate snugly against wraparound flanges on the periphery of the top cover. The bottom cover secured by screws in existing screw holes in the underside of the keyboard housing.

5 Claims, 5 Drawing Sheets

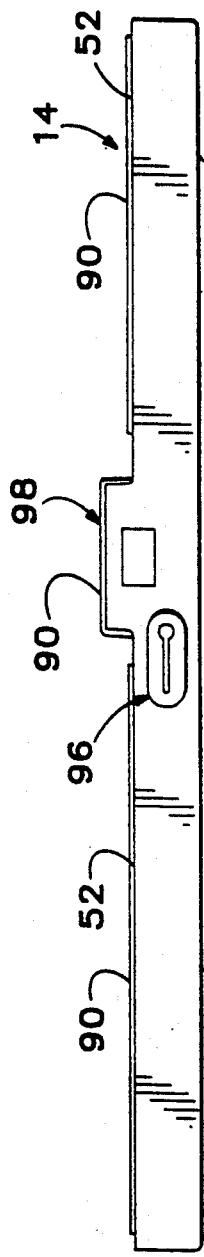
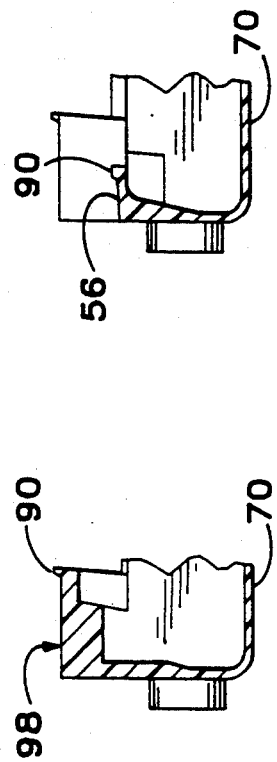
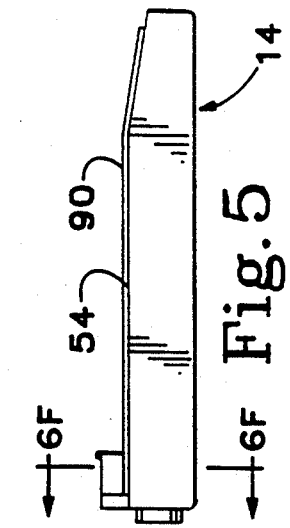
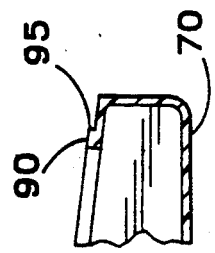
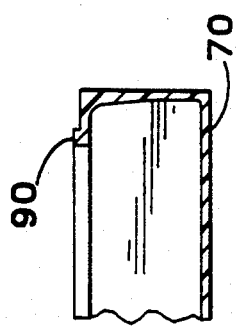
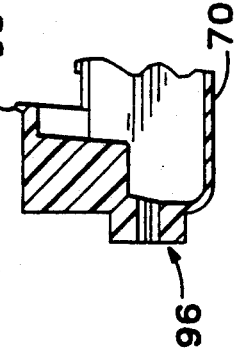

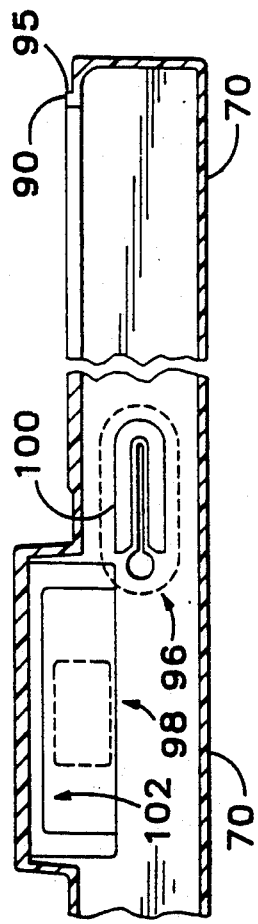
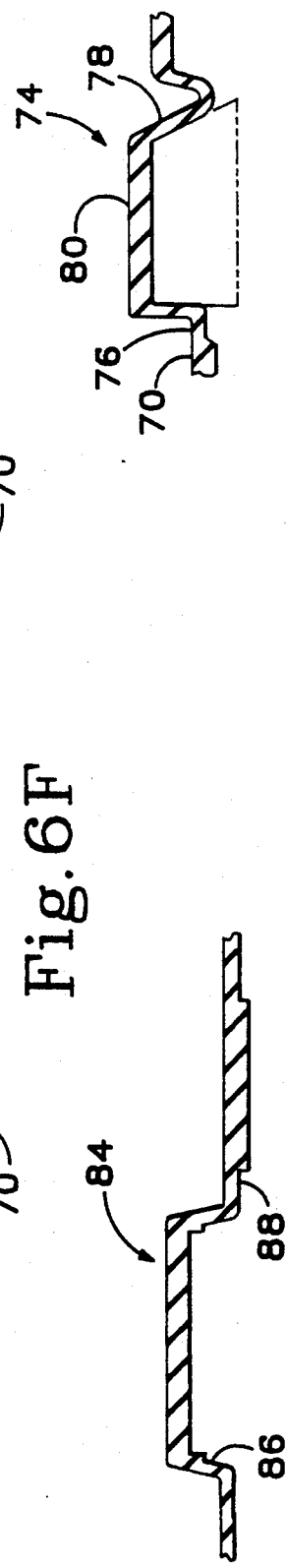
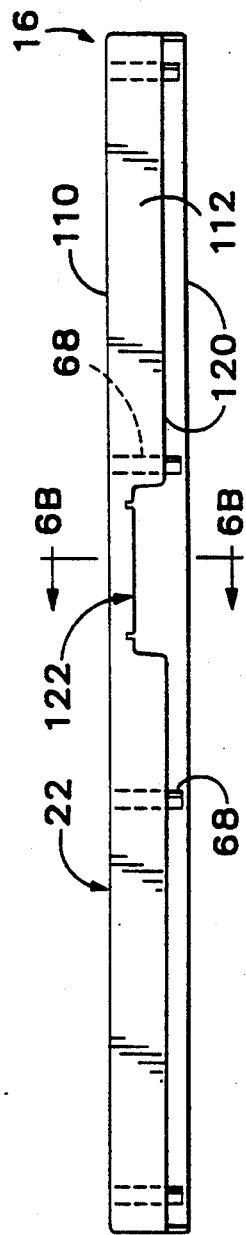

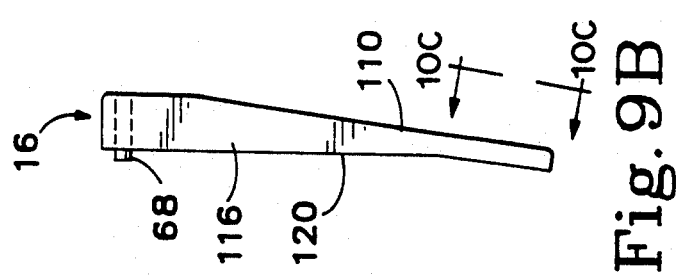
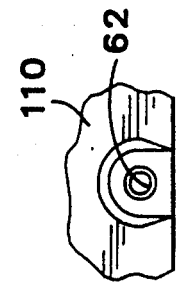
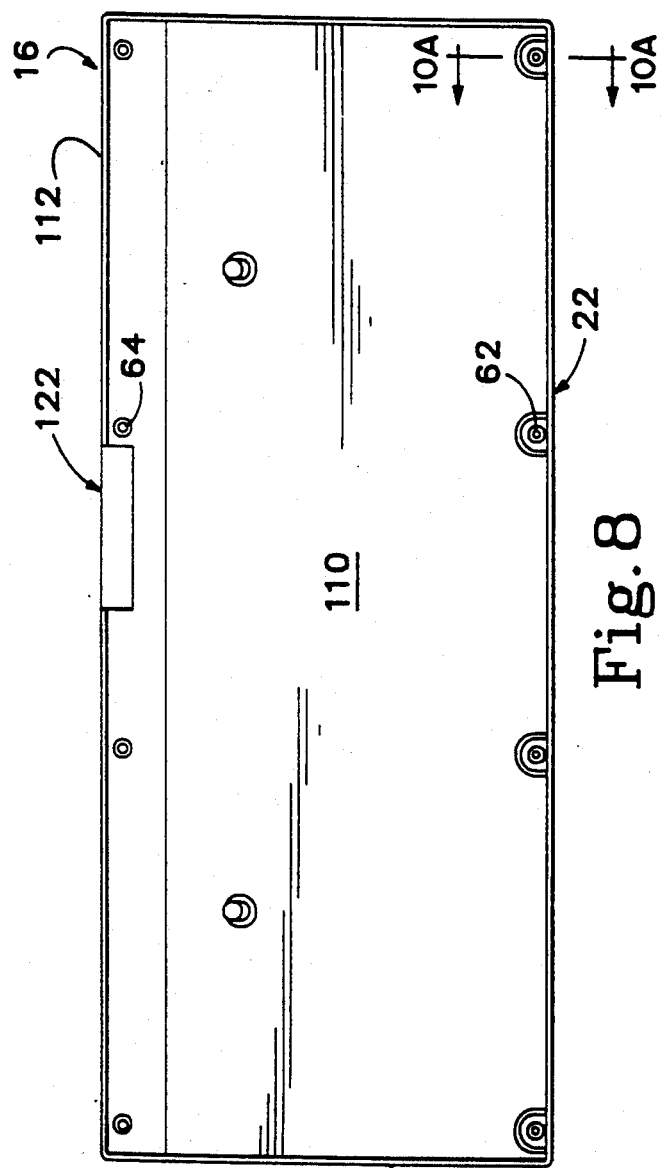
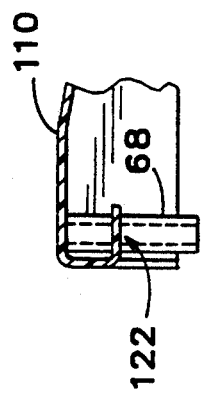
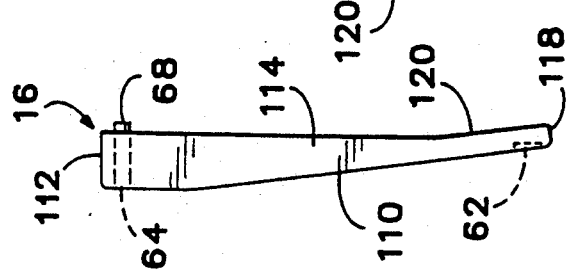
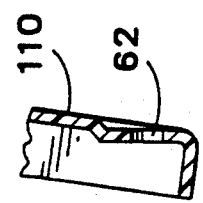

SEALED COMPUTER TERMINAL KEYBOARD

This is a continuation of U.S. patent application Ser. No. 07/118,843 filed Nov. 9, 1987, which is a continuation-in-part of U.S. patent application Ser. No. 07/089,812 filed Aug. 27, 1987, now U.S. Pat. No. 5,021,638.

BACKGROUND OF THE INVENTION

This invention relates generally to environmentally protected computer peripherals and more particularly to a sealed computer terminal keyboard for use in manufacturing environments.

In the past, computers and peripherals have been restricted to use in carefully controlled environments. As the use of computers has been extended into manufacturing environments, a need has arisen for computer peripherals that can be used reliably and safely in shops and assembly areas. There, the peripherals are exposed to dripping liquids, spills, dirt, machine shavings, sawdust, and other debris.

Conventional computer terminal keyboards have a housing with many discrete, closely-spaced alphanumeric keys protruding upward through openings in the top of the keyboard. In a manufacturing environment, spills and dirt can easily enter the keyboard and soon disable it. Keyboards are known with internally sealed electronics to provide protection against liquid spills, but debris can still enter spaces within the keys and foul their operation. The keyboards are also difficult to clean and cleaning usually requires disassembling the keyboard.

Panel assemblies are available from Duralith Corp., 525 Orange Street, Millville, N.J., with ELASTIKEY ™ molded silicone rubber actuators and key arrays. A 16-key numeric key pad, marketed under the trademark TACTON ™ by Bebie & Co., Ebmatingen, Switzerland, has a resilient molded rubber keypad cover with integrally formed actuators depending internally from the underside of each key. Neither of these designs is suitable for sealing a conventional computer terminal keyboard of a type typically having arrays of 88, 101, or similar numbers of full-travel keys arranged on the front of a stand-alone, elongate keyboard housing.

A need remains for a computer terminal keyboard that is suitably protected against spills and debris for use in a shop, assembly or other manufacturing environment.

SUMMARY OF THE INVENTION

One object of the invention is to provide a computer terminal keyboard unit that is sealed against both spilled liquid and particulate debris.

Another object of the invention is to seal a computer terminal keyboard while maintaining a full-travel keystroke.

A further object of the invention is to provide a sealed computer terminal keyboard having a feel to the user that is similar to the feel of a standard terminal keyboard.

An additional object of the invention is to seal a computer terminal keyboard in an economical manner, with a minimum of added assembly and structural modification, so that conventional keyboards can be readily retrofitted for use in a manufacturing environment.

A sealed computer terminal keyboard in accordance with the invention can be made starting with a conventional keyboard. Such a keyboard has a base and a top plate which are fitted together to form a housing. The top plate has a generally planar top face and the base plate is designed to rest on a flat surface and support the top face at an incline relative to the surface. The top and base plates have front, rear and side faces which form upper corners with the top face and bottom corners with the underside of the keyboard. Full-travel keys are mounted in a keyboard assembly within the keyboard housing and have closely spaced key caps protruding upward through openings in the top plate a predetermined distance above the top face. A conventional keyboard also has an attached cable in the back and can include a connector for a mouse or other control device.

The keyboard is sealed by a top cover composed of a resilient, waterproof material shaped to conform to the top plate and keys, and a bottom cover shaped to enclose the base of the keyboard and secure the top cover around its periphery to the keyboard. The top cover is shaped to provide a substantially planar surface on the top plate with elevated individual key covers integrally formed in the top cover to cover the key caps separately so that the keys can be individually actuated. The bulk of the top cover, those portions extending over the top face of the top plate and the sides of the keyboard housing, are formed in a first thickness sufficient to provide a durable covering. For convenience, these portions are called the field area of the cover. The top cover is formed with a wraparound margin including a periphery flange sized to extend around a side of the keyboard housing and a predetermined distance beneath a portion of the keyboard base to cover a margin of an underside of the keyboard housing. Portions of the top cover immediately adjacent and between the key covers, and the sides of the key covers, are preferably formed in a reduced, second thickness to allow for flexure as the keys are depressed. The top surface of the portions of the top cover surrounding and between the key covers is coplanar with the top surface of the field area so that spilled liquid and debris are easily wiped or brushed away. The undersurface of the top cover around and between the keys is relieved relative to the undersurface of the field area to provide the reduced, second thickness. The top cover is fit over the keyboard housing with the key caps nested within the individual key covers and the wraparound margin enclosing sides of the keyboard housing with the periphery flange extending beneath the keyboard housing. The top cover is secured to the underside of the keyboard housing along the periphery flange by compressing the flange against the underside of the housing, preferably by clamping the periphery flange of the top cover between the underside of the keyboard housing and an edge of a bottom cover formed to enclose the underside of the keyboard housing. The bottom cover is formed of a rigid material, such as metal or molded plastic, and has edges shaped to mate snugly against the wraparound flanges on the periphery of the top cover. The bottom cover is suitably secured, preferably by screws in existing screw holes in the underside of the keyboard housing. Preferably, the periphery flange is formed with a first thickness and an edge of increased thickness, greater than said first thickness, and the bottom cover is formed with an edge arranged to engage the periphery flange outwardly adjacent the thickened edge. This helps retain the top cover sealingly engaged between the keyboard housing and the bottom cover. Also, the wraparound margin is preferably formed with a sidewall portion of a first thickness and a corner portion for wrapping around a lower corner of the keyboard housing, the corner portion being thicker than the sidewall portion to help conform the keyboard cover to the keyboard housing and protect the keyboard if dropped.

The foregoing and other objects, features and advantages of the invention will become more readily apparent from the following detailed description which proceeds with reference to the accompanying drawings.

BRIEF DESCRIPTION OF THE DRAWINGS

FIG. 4 is a rear elevation view of the cover of FIG. 3.

FIG. 5 is an end elevation view of the cover of FIGS. 3 and 4, the opposite end being substantially a mirror image.

FIGS. 6A-6H are various partical sectional views taken along section lines A—A through G—G in FIGS. 3 and 5.

FIG. 7 is a rear elevational view of the keyboard bottom cover of FIGS 1 and 2, to scale and with dimensions as manufactured for use in combination with the top cover of FIG. 3.

FIG. 8 is an interior plan view of the bottom cover of FIG. 7.

FIGS. 9A and 9B are opposite side elevational views of the bottom cover of FIGS. 7 and 8.

FIGS 10A, 10B, and 10C are partial cross-sectional views taken along section lines A—A, B—B and C—C in FIGS. 8, 7 and 9B, respectively.

DETAILED DESCRIPTION OF THE PREFERRED EMBODIMENT

Figure 1:
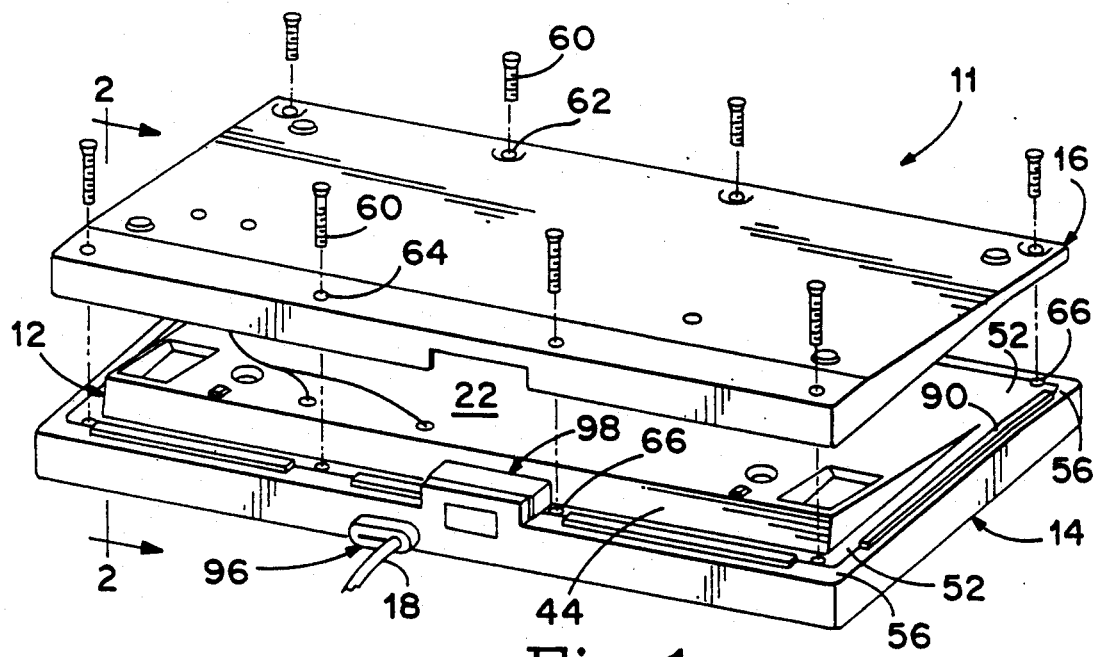
FIG. 1 is an exploded, diagrammatic, bottom rear perspective view of a sealed computer terminal keyboard in accordance with the invention.
Figure 2:
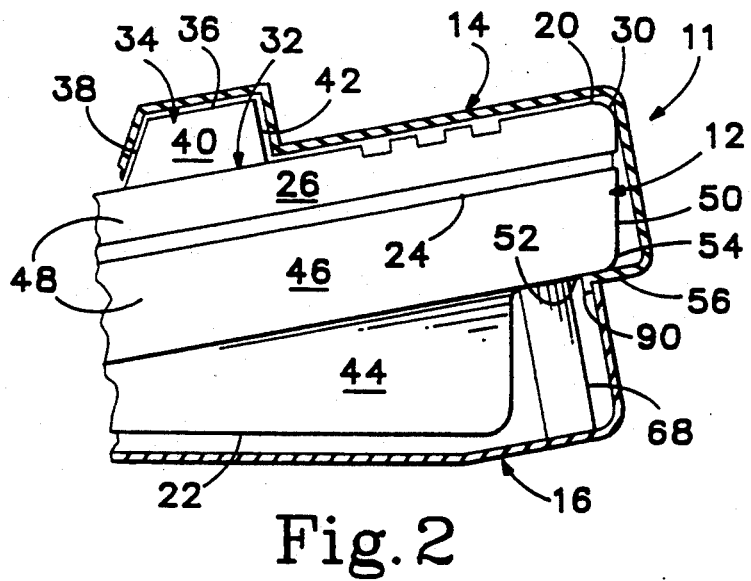
FIG. 2 is a cross-sectional view of the assembled and upright sealed keyboard taken along lines 2—2 in FIG. 1.

Referring to FIGS. 1 and 2, a sealed keyboard 11 in accordance with the invention is formed by enclosing a conventional, stand alone computer terminal keyboard 12 within a keyboard top cover 14 and a keyboard bottom cover 16. The keyboard 11 includes a cable 18 and a housing, typically formed of molded plastic top and bottom plates 20, 22, mated together along a dividing line 24, enclosing conventional mechanical and electrical keyboard components (not shown) typically arranged on a printed circuit board.

The top plate 20 has a rectangular, generally planar top face and short front, right and left side and rear faces (only left side face 26 and rear face 28 are shown) forming rounded upper corners 30 with the top face. Rectilinear openings 32 are formed in the top face of the top plate for key caps such as key 34 to protrude upward through the top plate from underlying mechanical and electrical components housed inside the keyboard.

Conventionally, the keys are formed of molded plastic with a slightly cylindrically-concave top 36 face, inclined front and side faces 38, 40 to give the key a trapezoidal front elevational profile, wider at the bottom and narrower at the top, and a back face 42 that is approximately normal to the top face. The keys protrude above the elevation of the top face of the top plate 20 a distance equal to or slightly exceeding the length of travel of a full-travel key switch when depressed. The length of travel of a key switch in a full-travel keyboard is typically 0.15 to 0.165 inches. Single-width keys are sized so that their top face is nearly square; double-width keys range from about 1⅜ times to two times the width of a single-width key, and a space bar is, for example, the width of eight single-width keys.

The bottom plate 22 is generally formed in such a way that the keyboard top face is slanted upward from front to rear. The bottom plate has an angular bottom portion 44, which provides the incline of the top face, and an overhanging upper portion 46 having front, side and rear faces (only left side and rear faces 48, 50 shown) adapted to mate along their edges with complementary edges of the corresponding faces of the top plate 20. The lower portion 44 is sized somewhat smaller than the upper portion. It is connected to the upper portion by an overhanging wall portion 52 that extends around the sides and rear of the keyboard and forms a rounded lower corner 54 along the front, side and rear faces of the bottom plate.

The top cover 14 of sealed keyboard 11 is formed by a resilient membrane sized and shaped to conform to the combined structure of keyboard 18 defined by the top plate 20 and key caps 34 and the upper portion 46 of the bottom plate and to provide an undercut periphery flange 56 which wraps around lower corner 54. The top cover is preferably molded of a tough but relatively soft (e.g., 30-50 durometer) silicone rubber, suitably Dow Corning SILASTIC 595. FIGS. 3-6H show suitable dimensions for various elements of an operative example of the top cover.

The bottom cover 16 is formed of a rigid or semi-rigid material, such as metal or molded plastic, in a shape which encloses the lower portion of 44 of bottom plate 22, with a blunt upper edge 58 extending around the front and rear sides of the keyboard in position to clamp the undercut periphery 56 of the top cover against overhang face 52. Long screws 60 are threaded through openings 62, 64 in the front and rear margins of the bottom cover into screw holes 66 conventionally provided in the front and rear margins of the bottom of keyboard 12. Screw holes 64 include tubular spacers 68 inside the rear of bottom cover 16.

Figure 3:
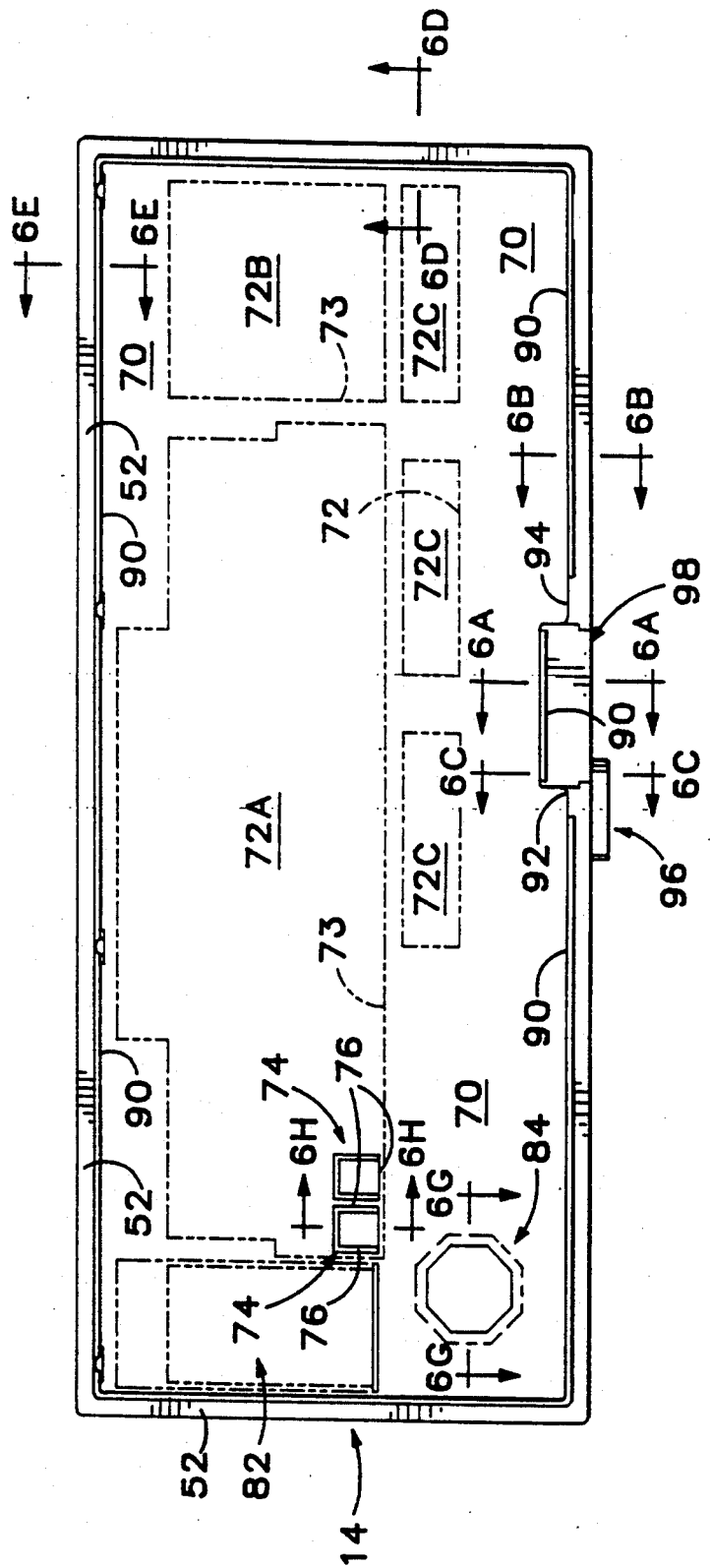
FIG. 3 is a bottom plan view of the elastic top cover of the keyboard of FIGS. 1 and 2, to scale and with dimensions as manufactured for one model of keyboard.

FIG. 3 shows the underside of an example of the top cover 14 particularly adapted for a Tektronix-made, DEC VT100-compatible keyboard with COMPTEC key caps. It also provides a plan view of the periphery flange 56 that wraps around lower corner 54 of the keyboard 12. The top cover 14 has a top wall portion which includes a field region 70 of a first thickness (e.g., 0.052 inch) and a series of rectilinear regions 72A, 72B, 72C bounded as indicated in dashed lines 73. The latter regions are positioned to overlie the openings 32 in the top face of top plate 20: region 72A over the principal array of alphanumeric keys; region 72B over the numeric and cursor keypad keys; and regions 72C over the function keys.

Individual key covers 74 are formed in the top cover in each of regions 72A, 72B, 72C. The key covers 74 are integrally formed in the top cover and interconnected by areas 76, referred to as diaphragm regions, of a second, reduced thickness (e.g., 0.025 inch). The sidewalls of the individual key covers are likewise of a second, reduced thickness (0.025 inch) to permit, together with the diaphragm regions, flexure of the individual key covers when the keys are depressed. The individual key covers are sized to just fit over their respective key caps.

FIG. 6H shows a key cap 34 in dashed lines and the key cover for such key cap in solid, hatched lines. The side wall on the front face 38 of key 34 is indicated by reference numeral 78, the field region 70 is identified and the diaphragm region (e.g., about 0.1 inch wide) surrounding and between key covers 74 is indicated by reference numerals 76. The top surface of the cover is planar over all of the areas between and surrounding each key. The reduced thickness of the diaphragm areas is provided by relieving or indenting the underside of the cover along the boundaries 73. Each key cover includes a top finger pad 80, of somewhat greater thickness (e.g., 0.062 inch) than that of the field region 70, overlying top face 36 of the key cap. Each pad is preferably molded with a slight cylindrical shape formed about an axis along section line H—H and a radius matching that of key face 36.

Referring back to FIG. 3, other feature formed in the top wall portion include a rectangular structure 82 and an octagonal structure 84. The rectangular structure 82 is merely an upward protuberance to conform to a like structure in the top plate 20 which is not a depressible key. Accordingly, no flexure of structure 82 is needed and its sidewalls and surrounding area of the cover can be of the first thickness. The octagonal structure 84, better seen in FIG. 6G, is shaped to conform to an octagonal, multiaxis directional control device built into the top panel of the top plate 20. This control device needs to be depressible at any position along its perimeter. Accordingly, structure 84 has sidewalls which have a lower (e.g., 0.10 inch) portion 86 of reduced thickness (e.g., 0.030 inch) and a surrounding diaphragm portion 88 (e.g., 0.15 inch wide) of reduced thickness (e.g., 0.20 inch) to permit flexure for actuation of the direction control device.

As shown in FIG. 3, and further in FIGS. 4, 5, 6B, 6D and 6E, the wraparound flange 56 includes an edge of increased thickness, or rib, which serves as a retainer 90. This retainer preferably extends around nearly the entire periphery of the top cover, with gaps 92, 94 in the back to ease removal of the cover from a mold. The retainer preferably has an inclined outer face 95 (FIGS. 6D and 6E), which also aids in removal from the mold. FIGS. 6B, 6D and 6E also show thickened corners where flange 56 wraps around the corner 54 of the keyboard housing. The thickened corners help conform the top cover to the keyboard housing during assembly and enhance shock resistance of the sealed keyboard in case it is dropped.

As shown in FIGS. 3, 4 and 6F, the center back side of the top cover includes a key-shaped opening 96 for keyboard cable 18 and a cover 98 for a mouse port (not shown) in the keyboard. The mouse port cover is molded closed but is scored in a rectangular pattern over the mouse port so that a window can be cut out for connecting a mouse or similar device to the keyboard. Both of these structures are formed with thick surrounding material 100,102 for reinforcement of the openings and to help seal around them. Retainer 90 preferably extends along the sides and lower face of the mouse port cover.

After the top cover has been molded, nomenclature (i.e., the alphabetic, numeric, punctuation and other character symbols) is applied to the individual keys. This is done by silkscreening, using a silicone rubber based ink, the nomenclature onto the top pads of the keys and then curing the ink into the material of the top cover. The entire cover is silkscreened at once. This is done by fitting the top cover over a nest having openings under the individual key covers and applying a vacuum through these openings to substantially flatten the top cover against the nest for silkscreening.

In many keyboards, such as the VT100 keyboard, the "Caps Lock" key is illuminated to indicate when it is set. This indicator is transmitted through the keypad for such key by drilling a hole in the keypad and securing a translucent silicone rubber plug in the hole.

Referring next to FIGS. 7, 8, 9A and 9B, the bottom cover 22 has a bottom wall 110, a rear wall 112, left and right side walls 114, 116 and front wall 118. The front, rear and side walls are formed to provide a surrounding blunt edge 120 contoured to wall 52 of keyboard 11 for securing the periphery 56 of top cover 20 against wall 52. These walls are sized and spaced to fit just outside retainer 90 in position to compress against a portion of face 95 The back wall 112 has a nearly centered rectangular cut-out 122, best seen in FIG. 10B, for mouse port cover 98. FIGS. 10A and 10C shows how the screw holes along the front wall of the bottom cover are relieved so that the assembled keyboard 11 will lie with bottom wall 110 flush against a support surface.

Keyboard 11 is assembled by pulling cable 18 through keyhole opening 96 from inside to outside of the top cover 14. The top cover is oriented so that the fields of individual key covers are aligned with the corresponding key caps of keyboard 12. Then the top cover is stretched over the top of keyboard 12, fitting the individual key covers over the key caps, and its periphery is pulled down over the sides of the upper portion of the housing so that flange 56 extends along wall 52, as shown in FIG. 1. Next, the bottom cover is fitted onto the under side of the combined keyboard housing and top cover assembly. The edge of the bottom cover is positioned along the outer side of retainer 90. Finally, screws 60 are threaded into screw holes 62, 64 and tightened to compress the edge of the bottom cover against flange 52 and retainer 90. If it is desired to use a mouse, the rectangular pattern in mouse port cover 98 is cut out to access the mouse connector.

In use, the sealed keyboard 11 is used in the same manner as keyboard 11, except that it can be used in a spill and debris prone environment without fouling. The thin, elastomer diaphragm and key cover side walls do not appreciably increase the pressure required to actuate the keys and permit a breakover feel to operation of the keys. The nomenclature, cured into the keypads, becomes an integral part of the top cover and thereby resists wear. The top cover does not have any crevices, and spills and debris are easily wiped or brushed from the top cover.

Having illustrated and described the principles of our invention with reference to a preferred embodiment and an operative example thereof, it should be apparent to those skilled in the art that the invention may vary in arrangement and detail without departing from such principles. We claim all variations and modifications within the scope and spirit of the following claims.

We claim:

1. A method for sealing a computer terminal keyboard for use in a spill- and debris-prone environment, the keyboard having a base and a top plate which are fitted together to form an elongate keyboard housing of generally rectilinear shape and an array of keys mounted in a keyboard assembly within the keyboard housing including a plurality of closely spaced key caps protruding upward through openings in the top plate a predetermined distance above a top face of the top plate; the method comprising:

molding a top cover of a resilient, waterproof material shaped to conform to the top place and key caps with elevated individual key covers integrally formed in the top cover to cover the key caps separately so that the keys can be individually actuated;

forming a wraparound margin in the top cove including a periphery flange sized to extend around a side of the keyboard housing and a predetermined distance beneath a portion of the keyboard base to cover a margin of an underside of the keyboard housing;

fitting the top cover over the keyboard housing with the key caps nested within the individual key covers and the wraparound margin enclosing sides of the keyboard housing with the periphery flange extending beneath the keyboard housing; and securing the top cover to the underside of the keyboard housing along the periphery flange by compressing the flange against the underside of the housing.

2. The method according to claim 1 in which the securing step includes forming a bottom cover for enclosing the underside of the keyboard housing, with an edge shaped to substantially conform to the shape of said margin of the underside of the keyboard housing, and clamping the periphery flange of the top cover between the edge of the bottom cover and the underside of the keyboard housing.

3. The method according to claim 2 in which the periphery flange is formed with a first thickness and an edge of increased thickness, greater than said first thickness, and the bottom cover is formed with the edge arranged to engage the periphery flange outwardly adjacent the edge of increased thickness, and wherein the clamping step includes engaging the edge of the bottom cover with the periphery flange outwardly adjacent the edge of increased thickness.

4. The method according to claim 1 in which the molding step includes forming the cover in a first thickness in areas of the keyboard spaced from the keys and forming the cover in areas immediately surrounding and between the keys in a second thickness less than the first thickness to permit sufficient flexure for actuating the keys through a full-travel keystroke.

5. The method according to claim 1 in which the wraparound margin is formed with a sidewall portion of a first thickness and a corner portion for wrapping around a lower corner of the keyboard housing, the corner portion being thicker than the sidewall portion.

* * * * *